Figure 6:
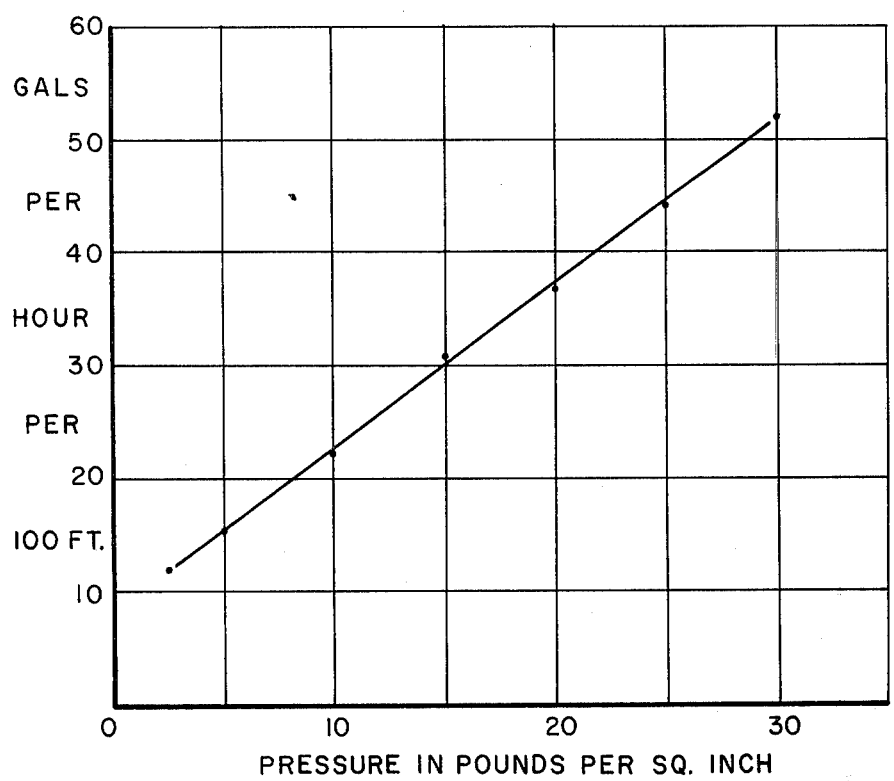

United States Patent [19]

Turner

[11] 4,003,408

[45] Jan. 18, 1977

[54] UNDERGROUND IRRIGATION POROUS PIPE

[75] Inventor: James E. Turner, Southlake, Tex.

[73] Assignee: George C. Ballas, trustee, Houston, Tex.

[22] Filed: Feb. 26, 1974

[21] Appl. No.: 445,866

[52] U.S. Cl. .............................. 138/118; 138/177; 239/145
[51] Int. Cl.² ........................................ F16L 11/04
[58] Field of Search ..... 138/118, 177, 178, DIG. 1; 264/53; 239/145; 210/170, 497

[56] References Cited

UNITED STATES PATENTS

| | | | |
|---|---|---|---|
| 1,254,906 | 1/1918 | Henderson | 138/40 |
| 1,989,427 | 1/1935 | Robey | 239/145 |
| 2,645,249 | 7/1953 | Davis et al. | 138/118 |
| 2,723,934 | 11/1955 | Morris et al. | 428/316 |
| 2,807,505 | 9/1957 | Weitzel | 239/269 X |
| 3,774,648 | 11/1973 | Edlin | 138/177 |

Primary Examiner—Richard E. Aegerter
Assistant Examiner—Frederick R. Schmidt
Attorney, Agent, or Firm—Bard, Springs & Jackson

[57] ABSTRACT

A porous pipe primarily of rubber and synthetic rubber reclaimed from rubber tires, ground to a relatively small granular size, with metal removed; such as, for example, would pass through a 30-mesh screen, process-mixed through a pipe extruder, with a much smaller binder mix of primarily polyethylene, along with vinyl, ABS binder, and a trace of attaclay. The resulting product is useful as a subsurface irrigation buried pipe, having high structural integrity effectively resisting soil-loading pipe collapse, and it even resists collapse from moderately large rocks in the soil, and yet has a high degree of flexibility along its length. A pipe is provided with cross sectional area of pipe wall more than twice the cross sectional area of the pipe opening. It is a water-leaking pipe formed in the process through the extruder with limited foaming from steam originating from absorbed moisture in the ground, reclaimed rubber tire material, and from residual gasses venting from the material mix, with product mix heating in the extruder, forming some open cell fluid flow paths. The foaming with steam and gasses from the mix also form labyrinth passageways between the rubber tire granuals and the polyethylene binder mix, and also through the binder mix that is non-compatible with the rubber granules but that forms a physical interconnective structural material binder therefor.

7 Claims, 8 Drawing Figures

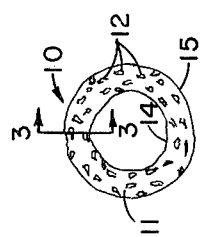
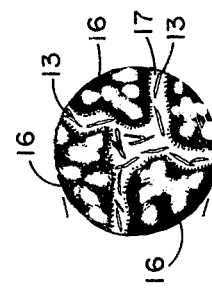
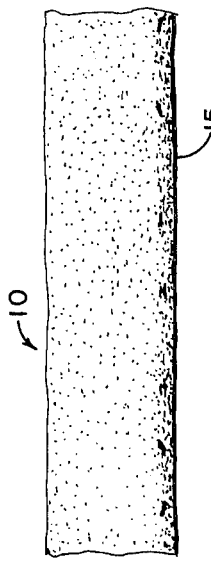
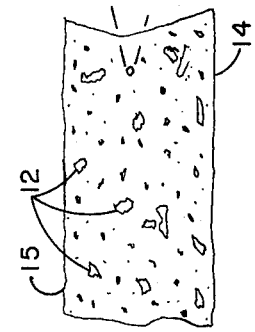
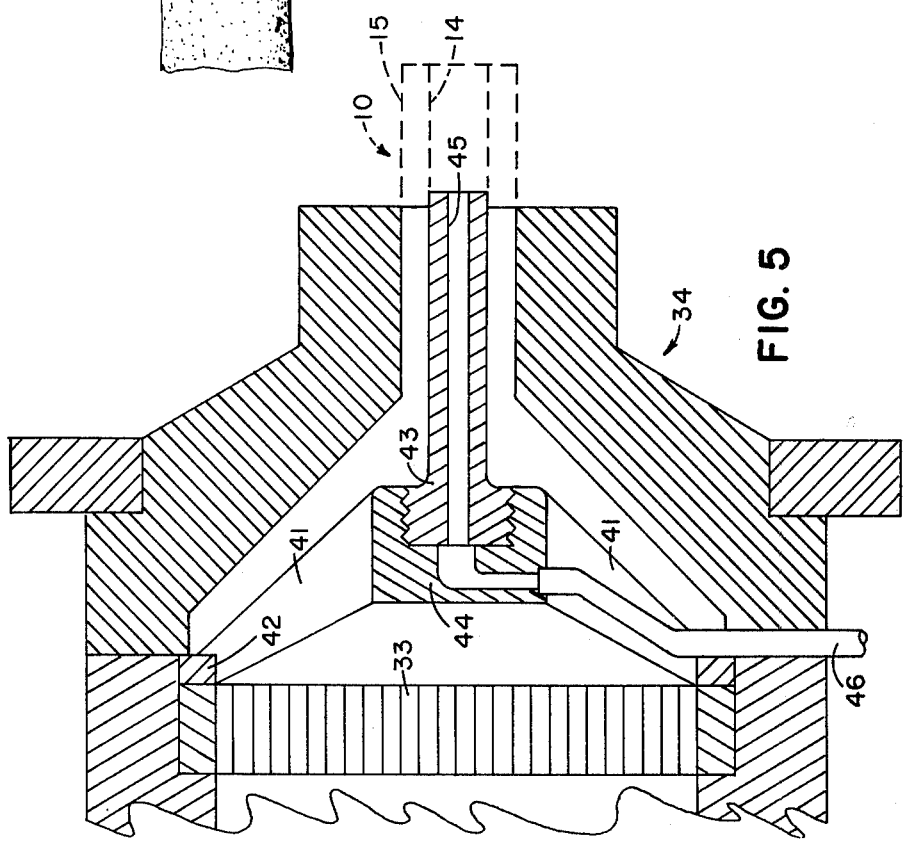

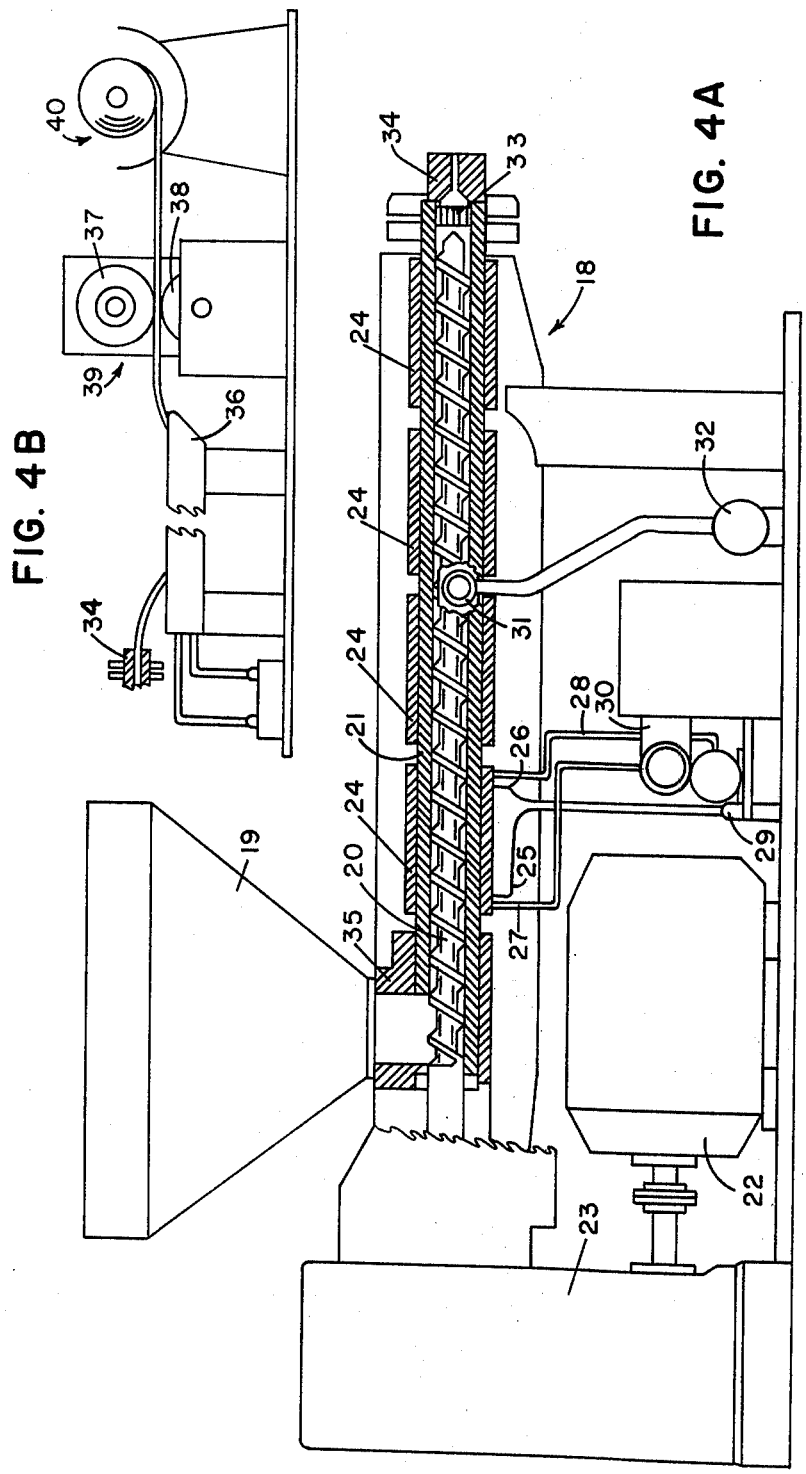

UNDERGROUND IRRIGATION POROUS PIPE

This invention relates in general to irrigation systems and, in particular, to an irrigation porous pipe processed primarily of reclaimed material from rubber tires, ground to small granular size, mixed with a binder, mainly of polyethylene, with walling sized to withstand soil loading in an underground irrigation environment.

For healthy plant growth and optimized crop production, and with turf grasses, it is water in the root zone area of the soil that counts. With above-ground watering, the water must enter the soil and penetrate to the root zone if it is to benefit the growing plants. Moisture that wets only the above-ground portions of grass platns and the layers of organic material and soil above the root is of particularly no value, and may be harmful with mineral salt crustation build-up through evaporation depositions of mineral content at the surface. A dense sod, for example, may absorb a quarter-inch or more of water before any of it enters the soil. Light, above-ground waterings encourage shallow rooting, thus producing plants that are subject to quickly drying out during intervals of no watering. Water lost through evaporation and run-off, with above-ground surface watering systems is a significant adverse factor in water shortage areas where the ground water table is relatively deep, and water pumping is required, and where water must be supplied over great distances. Above-ground watering encounters timing problems in that moist foliage overnight encourages plant diseases. Further, most golf courses are closed down at least one day a week, with above-ground watering generally presently used, being in many instances high pressure sprinkling systems. Another consideration in the production of a new product is the availability of raw material in this day of shortages, and if it can be made primarily of reclaimed rubber, and/or synthetic rubber, from used tires that present a severse disposal problem, so much the better. Many sprinkling systems have continuing labor and maintenance costs, with requirements such as moving sprinklers, walking the line, pop up or protruding sprinkler heads that many times are struck and damaged or broken off by mowers or other equipment. Further, freeze-up of pipes and other water carrying equipment is a problem, and with severe cold waves, many times causes costly damage. Another consideration is that of interference with normal yard work, with, for example, a porous pipe water distribution system with leaky pipe buried at an underground depth of ten inches or more, allowing all normal yard work, including roto-tilling. It is also important that nutrients and health-giving ingredients, some insecticides and, in some instances, herbicides, be distributed directly to the subsurface root zone in the soil of areas being irrigated. Growth of weeds should be minimized rather than enhanced, and cultivation requirements with cash crops optimally minimized.

Underground irrigation, to many, falls under the general category of drip irrigation used, in any event, in the daily maintenance of an adequate section of the root zones of plants with moisture somewhere between dampness and saturation or field capacity throughout the growing season. This system enables the attainment of an optimized soil-water-plant relationship that is conducive to much better growth and substantially better yields, with less water applied. Evaporation is substantially totally eliminated, pipes are out of the way of people and machinery, and water, along with fertilizer when used, is applied where it obviously does the most good, right at the roots. Water seeps from the underground pipe, and by capillary action and absorption spreads through the root system, maintaining a constant moisture level throughout the area of treatment.

Variation in the water level content in soil can create many problems, with, for example, expansion and contraction of soil under and around slab foundations. This can be such as to cause foundations to shift around and/or cracking of the foundations, brick walls, inside plaster, and sheetrock walls in homes. Thus, an underground system for maintaining a stabilized soil moisture state would go far in eliminating such disasterous home and building damage. Aeration is important in sewage treatment systems, with air pumped into and bubbled upward through affluent in anaerobic action fluid treatment ponds and tanks, however, in most instances, attainment of desired bubble size is a problem. Most pumped-in, formed air bubbles, in many installations, are too large and gravitate to the surface much too rapidly, so any system that would create small bubbles such as would very slowly drift upward through an affluent mix, is highly desired.

It is therefore a principal object of this invention to provide an underground irrigation system capable of efficiently supplying water and fertilizers to the root zone of plants, without soil structure damage.

Another object with such an underground irrigation system is to minimize water requirements, to minimize evaporation loss to the air, and to avoid mineral salt build-up in the soil.

A further object is to attain a steady, slow-weeping application of water, feeding a capilary absorption distribution action through soil through needed periods of water irrigation.

Still another object is the attainment of stabilized soil conditions under and around building foundations and other structures such as swimming pools.

Features of this invention useful in accomplishing the above objects include, in an underground irrigation porous pipe, a pipe made primarily of ground-up reclaimed rubber and/or synthetic rubber, such as obtained from old tires. The reclaimed rubber granuals, that are ground to a size such as would pass through a 30-mesh screen, are process-mixed through a pipe extruder, with a much smaller amount of binder ingredients that typically include: a binder mix of primarily polyethylene, along with vinyl ABS binder, and a trace of attaclay. The transverse cross-sectional area of the pipe walls is substantial, in relation to the cross-sectional area of the pipe opening, and is thick enough to have labyrinth passageways for seeping of water to the exterior of the pipe without soil-damaging water jets. The pipe is a subsurface irrigation buried pipe having high structural integrity effectively resisting soil-loading pipe collapse, while also having a high degree of flexibility along its length. The pipe is formed in the process through the extruder, with limited foaming from steam originating from absorbed moisture in the ground, reclaimed rubber tire material, and from residual gasses venting from the material mix, with product mix heating in the extruder, forming some open-cell fluid flow paths. Labyrinth passageways between rubber tire granular material and polyethylene binder mix, and through the binder mix, are also formed with the steam and gas foaming, or blowing, as the pipe is extrusion process formed.

A specific embodiment representing what is presently regarded as the best made of carrying out the invention is illustrated in the accompanying drawings.

In the drawings:

FIG. 1 represents a partial side elevation view of applicant's underground irrigation porous pipe;

FIG. 2, an end view of the pipe of FIG. 1;

FIG. 3A, an enlarged section of pipe walls taken along line 3 — 3 of FIG. 2;

FIG. 3B, a further enlargement of a small portion of the pipe wall section of FIG. 3A;

FIG. 4A, a partially cut away and sectioned view of a vented and temperature regulated screw type extruder used in producing the porous pipe;

FIG. 4B, a partial side elevation view of a long, extended, cold water tank (or trough) receiving hot pipe from the extruder die, a pipe puller, and a pipe coiler;

FIG. 5, a partially cut away and sectioned view of the extruder die tip end; and, FIG. 6, a gallons-per-hour per 100ft. flow rate to pressure graph for a 300ft. long section of ½ in. I.D. leaky pipe.

Referring to the drawings:

The porous pipe 10 with a short length, shown in FIG. 1, and in end view in FIG. 2, is made primarily of reclaimed rubber-like, previously vulcanized material such as that recovered from chopped-up old rubber tires with the metal removed. This rubber-like, previously vulcanized material is reground to generally less than one-sixteenth inch diameter granual size, even down to a size that passes through a 30-mesh screen, before being process mixed with binder material, forming a matrix interlocking the rubber-like granuals in the processed pipe 10. While the wall 11 thickness to pipe I.D. is such, with the pipe material compounded for the finished pipe, to give good structural integrity against soil loading collapse when buried in the soil as an underground irrigation water seeping pipe, it has a high degree of flexibility along its length in adjusting to required bends and turns necessary for underground installations. Foaming or blowing during product mix processing to the finished pipe 10 forms random pockets 12 (or voids) in the pipe wall 11, such as shown in more detail in the wall section enlargement of FIG. 3A where passageways to the exterior are not formed, or are late in forming with the blowing process action. Irregularly shaped labyrinth type channels 13 (shown in the further enlargement of FIG. 3B, an enlargement in the order of approximtely 120X), formed in the blowing process action are an essential feature of the finished porous pipe product. Enough blow process formed channels 13 are formed, interconnecting the inner surface 14 and outer surface 15 of the pipe 10, either individually or via interconnected channels 13, to provide the desired through-the-wall seepage passageways. While the blowing formed pockets 12 are not the desired result, some of them do interconnect with some blowing process formed channels 13, as part of some of the through-the-wall seepage passageways. The desired blowing process is provided primarily with steam from moisture previously absorbed by the previously vulcanized material granuals 16, and some residual gases in the granuals and/or binder material used in making pipe 10, with most blowing process formed labyrinth type channels 13 being developed in and though the interconnecting matrices 17 formed by the binder material interlocking the granulas 16 into the product pipe 10. With processing of the pipe, while the granuals 16 generally retain their physical integrity, there is some degree of surface material welding or merging with the binder material.

Porous pipe 10 is extruded from a two stage wave screw extruder 18, such as shown in FIG. 4A, with the ingredient mix fed from hopper 19 to the product mix drive wave screw 20 contained within and extending through substantially the entire length of the relatively long extruder cylinder 21. Extruder 18 is generally typical of screw type extruders available in both this country and abroad, equipped with a drive motor 22, a gear drive train section 23 output driving the wave screw 20. The extruder 18 is also equipped with a plurality of heating and cooling cylinder barrels 24 longitudinally positioned along the length of extruder cylinder 21, with each having cast-in resistance elements connected through wires 25 and 26, and cast-in cooling coils connected through cooling fluid lines 27 and 28 to electrical power source control 29 and cooling fluid source control 30, such as shown with only one of the cylinder barrels 24, as a matter of convenience. A vent 31, connected to a vacuum control 32, is positioned at any convenient location along the extruder cylinder 21 and wave screw 20, longitudinally, after the product mix temperature has risen, through heating control and product mix working, that blow venting can occur through the binder material content of the product mix. The other vent 31 position constraint is that it must be positioned far enough ahead of pressure head screen 33 that there is not as yet a reflected back pressure build up at that location along the wave screw 20. The product mix, forced through pressure head screen 33, is extruded from the extruder die 34 where effective blowing creation of irregularly shaped labyrinth type channels 13 occurs with lowering of product material pressure from the high pressures at pressure head screen 33 down to atmospheric pressure. The feed throat member 35 below hopper 19 may be equipped with cooling and/or heating structure to further aid in temperature control of the product mix and extension of the possible positioning range of vent 31 toward the hopper 19.

Porous pipe 10 being extruded from the extruder die 34 very quickly enters, as shown in FIG. 4B, a cooling traugh 36, approximately 40 feet long, filled with chilled water, at approximately 35° F. This quickly congeals the pipe binder matrices, with the blowing generated through wall passageways desired in the finished product. The pipe 10 is drawn from the cooling traugh 36 by rubber tired, wheels 37 and 38 puller assembly 39 and passed to a conventional reel pipe coiler 40.

Referring also to the enlarged extruder die 34 tip end of the extruder 18 product mix forced through pressure head screen 33 flows by thin vains 41 extended from mount ring 42 as supports for porous pipe I.D. die mandrel 43 and mandrel base 44 into which the I.D. die mandrel 43 is threaded. A center opening 45 in I.D. mandrel 43 is connected through passage 46 in base 44 and pipe 46 to the exterior venting of the interior of pipe being die extruded to atmosphere as it first comes from the die.

Excellent product production runs are obtained, for example, with prevulcanized material granulas ground from old rubber tires with metal removed but soft cording remnants remaining in a granular size consistency that would pass through a 30 mesh screen. These pre-vulcanized material granuals, as approximately 70% of the product mix, are mixed with the remaining 30% of the product mix in the hopper 19 of extruder 18. This is with the 30% of the product mix comprised of, by percentages:

| | |
|---|---|
| Polyethylene (high density) | 70% |
| Vinyl | 14% |
| ABS (Binder) | 15% |
| Attaclay | 1% |

The product mix is fed from the hopper 19 into the input end of the extruder cylinder 21 to product mix drive screw 20, where heat input and heat of working initially brings the product mix temperature up to approximately 300° F. Next, down the screw drive in the direction of material flow, before, and as the product mix approaches vent 31, the product mix temperature is raised to approximately 350° F, generally in the range of 350° to 400° F, and then with venting and immediately thereafter the product mix is cooled down to approximately 300° F. Then the product mix is heated up again to approximately 350° F as the product mix is approaching the pressure head screen 33, along with a pressure build up to the approximate range of 2000 to 3500 p.s.i. at the screw 20 drive pressure side of the pressure head screen 33. The process temperatures used are generally high enough to transform the binder material content of the product mix to the moulten fluid plastic state such that flow venting can occur there through while the pre-vulcanized material granulas generally retain their integrity, other than for some degree of surface welding or merging with the binder material in the interconnecting matrices 17. The porous pipe 10 is screw-pushed out through the extruder die 34 into cooling traugh 36 from which it is pulled and then rolled. Venting to a vacuum of 20 inches of mercury at vent 31 gives a product standard pipe with a seepage flow rate of 15 gallons per 100 feet per hour at five p.s.i. internal water pressure, as shown in FIG. 6, with the effective blow venting seepage passage action occurring as the pipe 10 is being extruded to the atmosphere. Venting to a five inch mercury vacuum with approximately the same product process temperatures results in the hightest leak pipe rate of 40 gallons per 100 feet per hour at 5 pounds p.s.i. water pressure. Further, venting to 25 inches of mercury vacuum results in the lowest leak pipe, with 12 gallons per 100 feet per hour at 5 pounds p.s.i. water pressure. The venting provided at vent 31 is quite effective at the product mix temperature at that process location at stabilizing the residual moisture and gas content in the product mix for good uniform blowing action control as pipe 10 is extruded to atmosphere from the die end 34.

The product mix may be varied with the pre-vulcanized material granuals being in the range of approximately 60 to 90 per cent of the product mix, and the binder material being in the corresponding related range of approximately 40 to 10 per cent of the product mix. Further, the binder material may be the mix previously outlined, or any one or two of the materials including polyethylene, vinyl, ABS (binder) with a trace of attaclay, or without, as may be used for product variation results as desired. In any event, the binder substance (whether of one or more ingredients) is transformed to the plastic or moulten state at the process temperatures used, and with mixing action within the screw extruder while the previously vulcanized material granuals generally retain their structural integrity.

Whereas the invention is herein illustrated and described primarily with respect to several embodiments hereof, it should be realized that various changes may be made without departing from essectial contributions to the art made by the teachings hereof.

I claim:
1. Irrigation conduit means comprising:
   a substantially flexible tubular member formed of a plurality of random sized, random shaped, and random spaced, elastomer bodies, and
   a polyethylene binder mix intermixed with said bodies to provide a porous sidewall having a labyrinthine network of irregularly shaped and sized channel-like apertures closely spaced at random along its length and about its circumference.
2. Irrigation conduit means according to claim 1 wherein said tubular member is formed of granulated elastomer bodies to provide said channel-like apertures.
3. Irrigation conduit means according to claim 2 wherein at least a substantial portion of said elastomer is a reclaimed rubber material.
4. Irrigation conduit means according to claim 3 wherein said reclaimed rubber material is discarded automobile wheel casings.
5. Irrigation conduit means according to claim 4 wherein said rubber material is in the form of granules having generally a diameter less than one-sixteenth inch.
6. Irrigation conduit means comprising:
   a substantially flexible tubular member formed of a plurality of random sized, random shaped, and random spaced elastomer bodies,
   said elastomer bodies being granulated reclaimed rubber of discarded automobile wheel casings and having generally a diameter less than one-sixteenth inch,
   a binder interconnecting said bodies to provide a porous sidewall having a labyrinthine network of irregularly shaped and sized channel-like apertures closely spaced at random along its length and about its circumference,
   said binder being present in the range of 10% to 40% by weight and being composed of a mixture of polyethylene, vinyl, ABS binder, and attaclay.
7. Irrigation conduit means according to claim 6 wherein said labyrinthine apertures are sized to provide a pipe leak rate of between 12 to 20 gallons of water per one-hundred feet per hour at an internal water pressure of between 5 to 10 pounds per square inch.

* * * * *

UNITED STATES PATENT OFFICE
CERTIFICATE OF CORRECTION

Patent No. 4,003,408  Dated January 18, 1977

Inventor(s) James E. Turner

Page 1 of 2

It is certified that error appears in the above-identified patent and that said Letters Patent are hereby corrected as shown below:

| | |
|---|---|
| Column 3, line 4, | "made" should read --mode--. |
| Column 4, line 12, | insert --commercially-- between "extruders" and "available". |
| Column 4, line 47, | "traugh" should be spelled --trough--. |
| Column 4, line 52, | "traugh" should be spelled --trough--. |
| Column 4, line 62, | insert --for-- between "exterior" and "venting". |
| Column 4, line 66, | "granulas" should be spelled --granuals--. |
| Column 5, line 33,34 | "granulas" should be spelled --granuals--. |
| Column 5, line 38, | "traugh" should be spelled --trough--. |

UNITED STATES PATENT OFFICE
CERTIFICATE OF CORRECTION

Patent No. 4,003,408  Dated January 18, 1977

Inventor(s) James E. Turner  Page 2 of 2

It is certified that error appears in the above-identified patent and that said Letters Patent are hereby corrected as shown below:

Column 6, line 7,  "moulten" should be spelled --molten--.

Column 6, line 12,  change "the" to --this--.

Column 6, line 15,  "essectial" should be spelled --essential--.

Signed and Sealed this

Twenty-fourth Day of May 1977

[SEAL]

Attest:

RUTH C. MASON  
Attesting Officer

C. MARSHALL DANN  
Commissioner of Patents and Trademarks